Patented Nov. 18, 1941

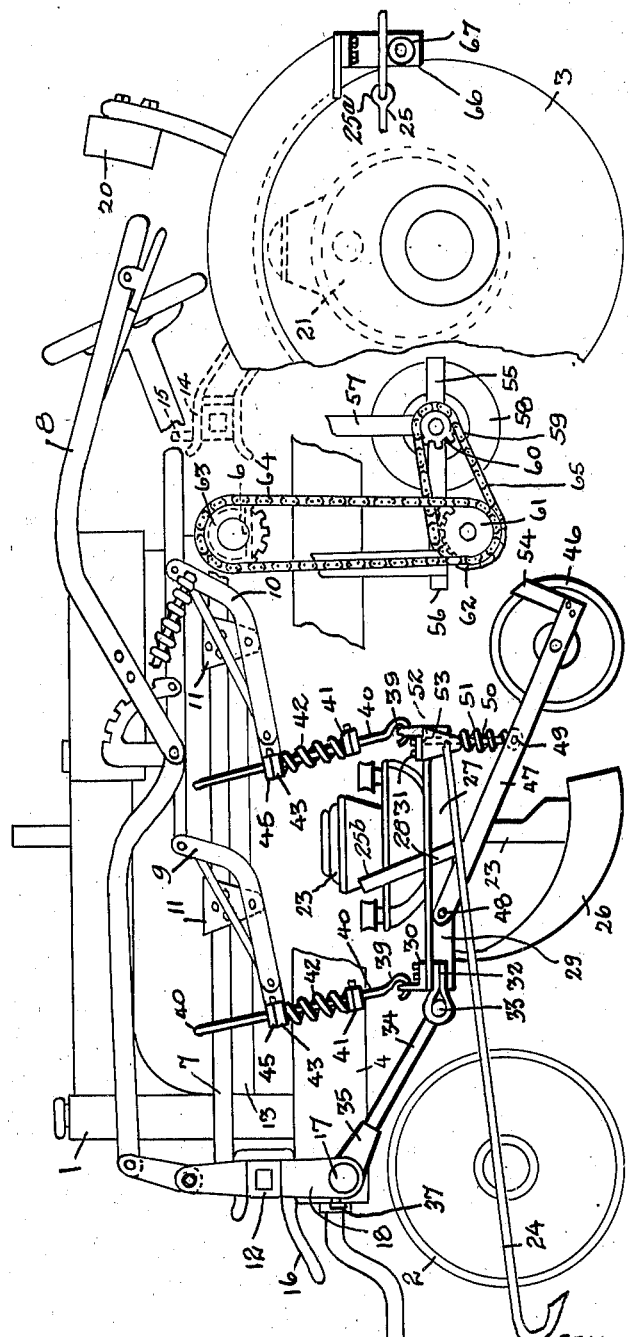

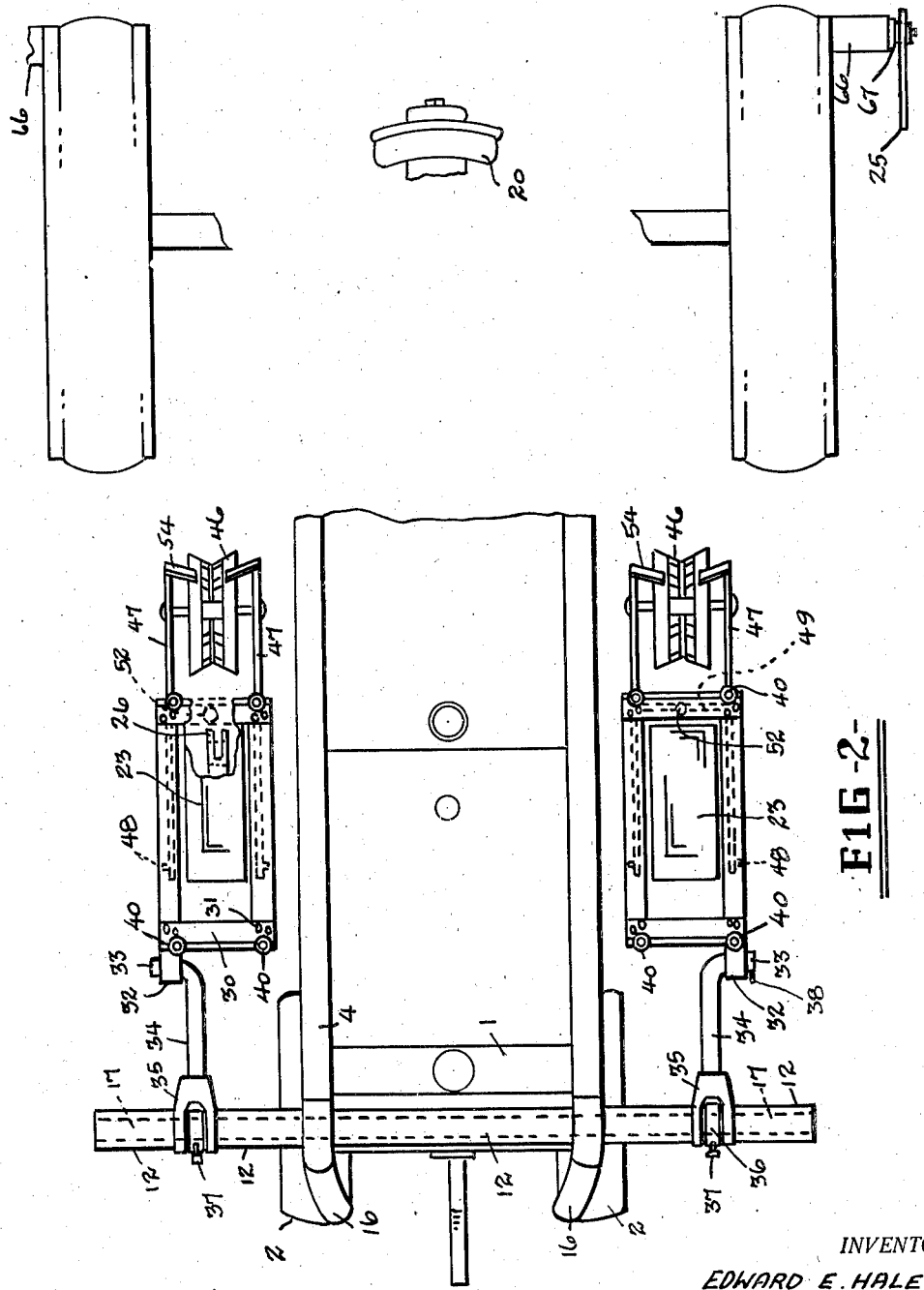

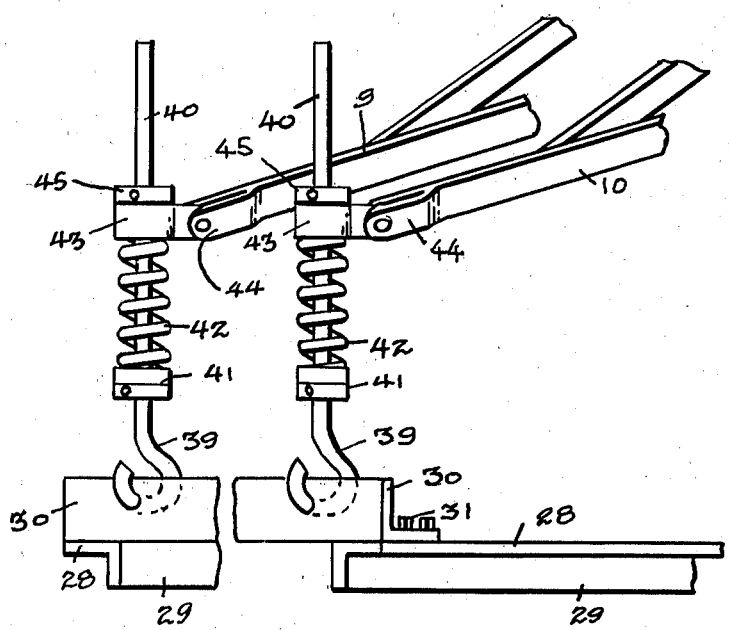
FIG-3-
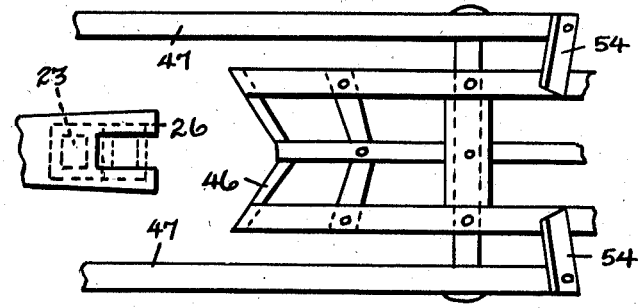
FIG-4-

2,263,128

UNITED STATES PATENT OFFICE 2,263,128

PLANTER ATTACHMENT FOR TRACTORS

Edward E. Hale, Farmer City, Ill.

Application March 8, 1938, Serial No. 194,685

3 Claims. (Cl. 111—59)

My present invention, in its broad aspect, has to do with improvements in means for adjustably and detachably mounting planter attachments, as for instance corn planters, and the like, in such a position on a tractor that the action and operation of the same is at all times observable from the driver's seat without necessitating the driver turning around. I am acquainted with many planter attachments, and corn planters, which are hooked to a clevis or the like at the rear of a tractor, but in order to observe the operation of the planter or the like, or the wire drum, or the check row wire and other features of the planter attachment, it is necessary for the driver or operator of the tractor to turn around which is undesirable for a number of reasons, among which are that he is not likely to see whether the planter is at all times efficiently operating, and he is inclined to deviate from a straight furrow or row while his attention is directed backward. The chances of damage to the planter mechanism and attachments is thereby increased, likewise of improper planting. Furthermore, by my invention, attachment of the planter apparatus is made simpler, more efficient, less costly to install, easier to operate, and the entire operation of planting is greatly simplified, and made more effective.

More particularly my present invention is designed to provide means for mounting a planter attachment, as for instance a corn planter, and wire attachment, and wire drum, and the like, on a tractor body or frame, with the corn planter located at the side and in the forward view of the driver. Said mounting means including but a few parts to accomplish the results desired and no appreciable modification of conventional tractor construction.

Other and equally important objects and advantages of my invention will appear as the description of the same proceeds, and it is here pointed out that changes in size, shape, construction, operation and arrangement of parts, and the adaptation of those parts to types of tractors and frames, are permissible provided same fall within the purview of what is claimed and the broad concept of my invention.

In the drawings wherein I have illustrated a preferred form of my invention:

Figure 1 is a side elevation showing the invention as applied to a conventional form of tractor;

Figure 2 is a top plan view of the invention as applied to a conventional form of tractor with certain parts broken away to show certain details more clearly;

Figure 3 is a perspective view, partly broken away, and shows the manner of connection between the pivoted levers and the eye bolts, and Figure 4 is a detailed view of the press wheel assembly.

In the drawings wherein like characters of reference are used to designate like or similar parts throughout the several views:

The conventional parts of a full two plow tractor, to which for purposes of illustration only, my present invention is applied, and of a conventional type of cultivator frame, and a conventional type of power lift, are all shown in dotted lines, and therefore the reference characters used in designating the parts of this conventional apparatus have lead lines which are dotted. The tractor radiator is designated by the numeral 1, the front wheels by 2, the rear wheels by 3, the tractor frame by 4, the power take off by 6 and the principal parts of a conventional cultivator frame are generally designated by 7. The cultivator frame has an adjustable pivoted hand lever 8 connected with a pair of pivoted depth adjusting levers 9 and 10. The pivoted depth adjusting levers are on brackets 11 attached to the frame 7, and the frame has a front bar 12, side bars 13, and is carried in attaching brackets 14 with removable pins 15 for retaining the same therein, and front skids 16, so that the tractor may be driven into the frame when it is desired to attach the cultivator frame to the same. Rods 17 at each side of the tractor at the front beneath the front bar 12 are attached by L-brackets 18 to the front bar 12 as shown in Figure 11, and one end of each rod 17 may be welded to one L-shaped bracket, while its remaining or other end is slipped into an opening in the companion L-shaped bracket for quick detachability. The tractor seat is designated by 20, the transmission by 21. These parts are all conventional and well known and form no part of my present invention. Neither does the conventional type of corn planter 23, marker 24, check wire 25 and knobs or trips 25a thereon, and check wire fork 25b for the corn planter, or shoe 26 form a part of my present invention. My present invention comprises means whereby a conventional corn planter, shown in dotted lines at 23, may be mounted on the usual cultivator frame on the usual tractor, at one side of and in the fore vision or forward view of the driver, as well as a mounting for the wire drum, and drive for the same through the power take off 6, and a mounting for the press wheel, and brackets for the wire to guide the same about the rear of the tractor. It is to be understood that my invention includes twin units, one on each side of the tractor, for mounting twin planters, so that in the description hereinafter it will be understood that in referring specifically to parts and operations on one side only, similar parts and operations on the other side of the tractor and frame are included.

Referring now to my invention in detail, I provide a rectangular angle iron platform 27 on each side of the tractor located at the side and in the forevision of the driver. The corn planter is carried on the platform. Each frame has spaced side rails or bars 28, with the flanges 29 extending downwardly and opposed to each other on the inside of the frame. The end bars 30 of each frame have one flange extending upwardly, and are bolted as at 31 to the side bars. The forward end of the side rail or bar 28 at the outside of each frame as shown in Figure 2, has an eye iron 32 bolted thereto, through which extends the angularly and outwardly bent end 33 of a coupling bar 34—one for each frame. The other end of each coupling bar 34 is formed with a bifurcated fitting 35 having eyes through which the respective rods 17 extend to hook the frames to the cultivator frame. There are suitable collars 36 held by set screws 37 for positively positioning the coupling bar on the rods 17, and the angled ends 33 are held in the frame eye-irons 32 by suitable cotter pins 38 or the like.

It will be noted that the frames have a hinged or pivoted attachment to the cultivator frames so that they may be raised or lowered. The respective ends of each of the end bars 30 each has an opening in the upwardly extending flanged parts through which the hooked ends 39 of four eye bolts 40 engage. Part way up each bolt shank is a stop collar 41 above which is a spring 42 which bears against a swivel fitting 43 pivoted to the forked end 44 of each leg of the adjusting levers 9 and 10, and each bolt extends through each swivel fitting and is adjustably held in place therein by adjustable stop collars 45 so that each corn planter frame or platform 27 is supported or swung from four eye-bolts 40 at its corners from the two adjusting levers 9 and 10. The conventional type of corn planters 23 are mounted on the frames and are adjustable as to depth, and are also movable to and from the ground.

Disposed back of the shoe 26 of each corn planter 23 is a press wheel 46. Each press wheel is mounted between two bars 47 pivotally mounted as at 48 to the downwardly depending flange 29 of the platform side bars or rails 28 so that each press wheel swings up and down on the companion platform 27. On a transverse journal coupling 49 between each pair of bars 47 is an eye bolt 50 having a spring 51, and bolted through an opening 52 in the rear end bar 30 of each platform 27, so that the press wheels may ride up and down over clods and stones and the like. Suitable downwardly slanting and outwardly extending elongated ears 53 are provided at the outside rear part of each platform 27 to pivotally mount the markers 24, and each press wheel has a scraper 54 which also functions as an end reinforcing and attaching bar for the bars 47. It will therefore be seen from the foregoing that twin corn planters, twin press wheels, twin markers, and accompanying parts including cooperating structure for the check wire, are supported on my invention at the side and in the forevision of the tractor driver, and that such parts are adjustable both as to depth and contact with the ground by means of conventional cultivator frame parts, and that such parts are also adjustable to compensate for irregularities in the ground.

On the cultivator frame 7 are mounted in advance of the rear axle of the tractor on each side thereon on the side bars 13 a supporting frame 55 including a bottom bar 56, and spaced end bars 57, on which is mounted the wire drum 58 which has a tension adjustment wheel 59 and a drive sprocket 60. Mounted in advance of the drive sprocket 60 on the supporting frame 55 are a pair of speed reduction sprockets 61 and 62, and on the power take off 6 is mounted a sprocket 63. Chain drives 64 and 65 connect sprockets 60, 61, 62, and 63 to operate the wire drum through the conventional power take off. It will be noted that by this means the wire drum is located handily beneath the tractor, and is a depending structure from the tractor frame members 4.

Since the check wire 25 passes to either side of the tractor and then out the back thereof, I provide a pair of triangular bracket members 66 at the rear of the tractor and attached by bolts to the rear wheel fender supports. Each of the brackets carries a flanged roller 67 on which the check wire runs so that it will not become entangled in the mechanism of the tractor or auxiliary parts, and so that it will be fed freely and in proper position as the tractor moves along over the ground.

In describing the operation of my invention it is pointed out that with many planter devices now in use it is necessary for the operator of the power vehicle to turn around and direct his attention backward, thereby greatly increasing the chances of improper planting. In operation, a corn planter of conventional design, or the like, designated 23 is mounted on the platform 27 at the side of the tractor and in advance of the drivers seat. If twin planters are used as shown in Figure 1, a platform is carried on both sides of the tractor. The platform 27 is carried by the conventional cultivator frame 7. Ordinarily such a frame rests on the ground and the tractor is driven "into" it; that is, as the tractor moves forward, the skids 16 pick up the frame and it is assembled on the tractor and held by removable pins 15. The corn planter frame or platform is suspended or mounted on eye bolts 40 which are resiliently mounted or attached to adjusting levers 9 and 10 within reach of the driver so that the platforms may be raised and lowered at will (operative to inoperative positions or vice versa). A check wire of conventional form is used with my attachment and the tractor follows the check wire which passes and engages the operating lever of the corn or seed planter as the tractor moves over the ground. Beneath and forward of the planter is the shoe 26 and back of the planter is the press wheel 46; the shoe forms the furrow and the press wheel covers up the seeds after planting. All of these parts are ahead of the operator so that it is unnecessary for the operator to turn around, and all parts are attached to and are adaptations to a conventional cultivator frame. The power take-off 6 operates the wire drum 58 through the sprocket and chain connections shown in Figures 1 and 8, and these in turn are carried by the tractor frame. A resilient mounting is provided by springs 42 and the frame assembly is pivotally mounted on the frame and to the tractor through coupling bar (or bars) designated 34 which pivotally engage rod 17. Attention is called to the fact that my device is compact, efficient, and desirable as an adaptation to a planter structure for a tractor and cultivator frame assembly, using but few additional parts, and not modifying appreciably the structure either of the tractor, the cultivator frame, the corn planter, or any other conventional mechanisms used, and that by disposing such conventional mechanisms at the places where they may be most handily observed and operated without appreciably modifying them or adding intricate supplementary structure, I have provided a useful, practical and unique assembly.

Changes may be made in the size, shape and arrangement of parts to meet practical requirements and to adapt the structure to changes in conventional mechanisms on which same is used; it is therefore understood that my broad inventive concept and the scope of this invention is to be determined by the claims appended hereto and forming a part of this specification.

I claim:

1. The combination with a frame of the type adapted to be removably mounted on a tractor for easy detachability and carrying pivoted levers and a hand lever for adjusting the positions of said pivoted levers; of means for mounting a seed planter at the side of the tractor and in the forward view of the operator thereof, said planter having a furrow opening shoe, said means comprising an elongated platform of open rectangular construction which carries the planter and through which the shoe of the planter depends, a member rising from each of the corners of the platform and flexibly connected thereto, said members being slidably and resiliently connected to said pivoted levers whereby said platform is adapted to move vertically a limited extent to accommodate irregularities of the ground over which the planter moves, actuation of said hand lever serving to adjust the extent of the vertical movement of the platform and to raise the platform and planter to transport position, a draft bar having ends pivotally connected, respectively, to the front of the frame and the front end of the platform, and a press wheel assembly flexibly connected to the platform.

2. The combination with a frame of the type adapted to be removably mounted on a tractor for easy detachability and carrying pivoted levers and a hand lever for adjusting the positions of said pivoted levers; of means for mounting a seed planter at the side of the tractor and in the forward view of the operator thereof, said planter having a furrow opening shoe, said means comprising an elongated platform of open rectangular construction which carries the planter and through which the shoe of the planter depends, said platform being formed of angle iron members to provide the side and end members of the open rectangular construction, a bolt rising from each of the corners of the platform and flexibly connected thereto, said bolt being slidably and resiliently connected to said pivoted levers whereby said platform is adapted to move vertically a limited extent to accommodate irregularities of the ground over which the planter moves, actuation of said hand lever serving to adjust the extent of the vertical movement of the platform and to raise the platform and planter to transport position, a draft bar having ends pivotally connected, respectively, to the front of the frame and the front end of the platform, and a press wheel assembly flexibly connected to the platform.

3. The combination claimed in claim 1, further characterized by the seed planter being of the check wire operated type, and means mounted on the tractor to hold the wire laterally of the tractor and prevent fouling therewith.

EDWARD E. HALE.